(12) United States Patent
Franke et al.

(10) Patent No.: US 8,833,135 B2
(45) Date of Patent: Sep. 16, 2014

(54) SENSOR SYSTEM AND METHOD FOR CALIBRATING A SENSOR SYSTEM

(75) Inventors: Axel Franke, Ditzingen (DE); Mirko Hattass, Stuttgart (DE); Alexander Buhmann, Stuttgart (DE); Marian Keck, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 13/197,084

(22) Filed: Aug. 3, 2011

(65) Prior Publication Data

US 2012/0036915 A1 Feb. 16, 2012

(30) Foreign Application Priority Data

Aug. 12, 2010 (DE) .......................... 10 2010 039 236

(51) Int. Cl.
*G01P 15/125* (2006.01)
*G01P 21/00* (2006.01)
*G01P 15/08* (2006.01)

(52) U.S. Cl.
CPC ....... *G01P 15/125* (2013.01); *G01P 2015/0814* (2013.01)
USPC .................. 73/1.38; 73/514.35; 73/514.32

(58) Field of Classification Search
USPC .................. 73/1.37, 1.38, 862.381, 862.52, 73/862.621, 862.622, 862.68, 488, 514.01, 73/514.32, 514.35, 514.38
See application file for complete search history.

(56) References Cited

U.S. PATENT DOCUMENTS

| | | | | |
|---|---|---|---|---|
| 5,415,043 A * | 5/1995 | Zabler et al. | ................ | 73/514.38 |
| 5,618,989 A * | 4/1997 | Marek | ............................ | 73/1.38 |
| 5,744,719 A * | 4/1998 | Werner | ....................... | 73/514.32 |
| 6,032,532 A * | 3/2000 | Brun et al. | ................. | 73/514.32 |
| 6,122,964 A * | 9/2000 | Mohaupt et al. | ........... | 73/514.32 |
| 6,684,698 B2 * | 2/2004 | Geen et al. | ................. | 73/504.14 |
| 7,258,012 B2 * | 8/2007 | Xie | ............. | 73/514.32 |
| 7,279,761 B2 * | 10/2007 | Acar et al. | ..................... | 257/415 |
| 7,554,340 B2 * | 6/2009 | Furukubo et al. | ............. | 324/661 |
| 7,757,393 B2 * | 7/2010 | Ayazi et al. | ..................... | 29/847 |
| 7,849,742 B2 * | 12/2010 | Wang et al. | ................. | 73/514.32 |
| 7,878,066 B2 * | 2/2011 | Scheibner et al. | ............. | 73/651 |
| 8,146,426 B2 * | 4/2012 | Sugiura et al. | ............. | 73/514.32 |
| 8,171,793 B2 * | 5/2012 | Foster | ....................... | 73/514.32 |
| 2003/0056589 A1 * | 3/2003 | Geen et al. | ................. | 73/504.14 |
| 2004/0025591 A1 * | 2/2004 | Yoshikawa et al. | ........ | 73/514.32 |
| 2005/0217372 A1 * | 10/2005 | Ao | ................... | 73/488 |
| 2005/0235751 A1 * | 10/2005 | Zarabadi et al. | ........... | 73/514.01 |
| 2009/0320596 A1 | 12/2009 | Classen et al. | | |
| 2010/0242606 A1 * | 9/2010 | Kanemoto | ................. | 73/514.38 |
| 2011/0113880 A1 * | 5/2011 | Schmid et al. | ............. | 73/514.01 |
| 2011/0132089 A1 * | 6/2011 | Jeong et al. | ................. | 73/514.32 |
| 2011/0303010 A1 * | 12/2011 | Yang | ......................... | 73/514.32 |

FOREIGN PATENT DOCUMENTS

| | | | | |
|---|---|---|---|---|
| DE | 102006059928 | | 8/2008 | |
| WO | WO 2010026843 A1 * | | 3/2010 | ........... G01P 15/125 |

* cited by examiner

*Primary Examiner* — Hezron E Williams
*Assistant Examiner* — Alexander Mercado
(74) *Attorney, Agent, or Firm* — Kenyon & Kenyon LLP

(57) ABSTRACT

A sensor system having a substrate and a mass which is movably suspended relative to the substrate is described, the sensor system including detection arrangement for detecting a deflection of the seismic mass relative to the substrate along a deflection direction, the detection arrangement including a first measuring electrode affixed to the substrate and a second measuring electrode affixed to the substrate, and a first overlap, which is perpendicular to the deflection direction, between the first measuring electrode and the seismic mass along the deflection direction is greater than a second overlap, which is perpendicular to the deflection direction, between the second measuring electrode and the seismic mass.

11 Claims, 1 Drawing Sheet

SENSOR SYSTEM AND METHOD FOR CALIBRATING A SENSOR SYSTEM

CROSS REFERENCE

The present application claims the benefit under 35 U.S.C. §119 of German Patent Application No. DE 102010039236.7, filed on Aug. 12, 2010, which is expressly incorporated herein by reference in its entirety.

FIELD OF THE INVENTION

The present invention is directed to a sensor system.

BACKGROUND INFORMATION

An acceleration sensor having comb electrodes and including a seismic mass connected to the substrate in a deflectable manner, substrate electrodes which are fixedly connected to the substrate and counter-electrodes which are fixedly connected to the seismic mass is described in German Patent Application No. DE 10 2006 059 928 A1. The substrate electrodes and the counter-electrodes are each designed as substrate plates and counter-plates which run parallel to the deflection direction and which partially overlap in an idle state.

The electrodes of such sensor systems used to detect a deflection must be electrically calibrated before the sensor system is started for the first time in order to compensate for manufacturing fluctuations. Furthermore, an evaluation circuit which evaluates the signals measured by the electrodes must be calibrated. A calibration of this type is usually carried out by applying a reference deflection which is measured with the aid of the electrodes and the evaluation circuit. A scaling factor, hereinafter also referred to as the calibration factor, which is a measure of the deviation of the sensor system and is used in future measurements for correcting the measured signals, is determined by comparing the measured deflection with the reference deflection. The sensor system must be idle during a calibration procedure of this type.

SUMMARY

The sensor system according to the present invention and the method according to the present invention for calibrating the sensor system may have the advantage that a calibration of the sensor system is made possible without applying a reference deflection. Furthermore, it is thus advantageously not necessary for an idle position to be achieved to carry out the calibration. This is accomplished by the fact that the first overlap is larger than the second overlap. When the seismic mass is deflected from an idle position along the deflection direction, different measured signals are measured by the first and the second measuring electrodes. If the geometric difference between the first and second overlaps is known, the scaling or calibration factor may be inferred from the difference between the two different signals. A calibration is thus carried out much more easily, faster, and more cost-effectively, which reduces the cost of manufacturing the sensor system. The sensor system preferably includes a micromechanical acceleration sensor, the substrate preferably including a semiconductor material, and in particular silicon. The deflection of the seismic mass is capacitively determined by a variation in a first electrical capacitance between the first measuring electrode and the seismic mass as well as by a variation in a second electrical capacitance between the second measuring electrode and the seismic mass. The first and second capacitances are varied either by a variation in the first and second overlaps (a so-called comb electrode system) or, alternatively, by a variation in a first distance between the first measuring electrode and the seismic mass as well as by a variation in a second distance between the second measuring electrode and the seismic mass (a so-called capacitor plate system). In both cases, the deflection direction is preferably oriented parallel to a main extension plane of the substrate. Alternatively, however, it is also possible for the deflection direction to be oriented perpendicularly to the main extension plane. The overlap difference between the first and second overlaps is preferably between 0.1 and 10 micrometers, particularly preferably between 0.5 and 3 micrometers, and most preferably between 1 and 2 micrometers.

Advantageous embodiments and refinements of the present invention are described below with reference to the figures.

According to a preferred specific embodiment, it is provided that the first overlap includes a partial covering of the seismic mass by the first measuring electrode perpendicularly to the deflection direction; and the second overlap includes a partial covering of the seismic mass by the second measuring electrode perpendicularly to the deflection direction, the first overlap along the deflection direction being larger than the second overlap. The calibration, which is simpler, faster and more cost-effective, is thus advantageously made possible even for a sensor system of this type, which includes a comb electrode structure. The deflection is detected by a variation in the particular overall surface produced on the basis of a deflection of the seismic mass relative to the substrate. During the deflection, the signals of the first and second measuring electrodes for determining the calibration factor are different, since an extension of the first overlap is larger than an extension of the second overlap along the deflection direction.

According to a preferred specific embodiment, it is provided that the seismic mass includes a first counter-electrode which is assigned to the first measuring electrode and a second counter-electrode which is assigned to the second measuring electrode in such a way that the first overlap is provided between the first measuring electrode and the first counter-electrode and the second overlap is provided between the second measuring electrode and the second counter-electrode. A comparatively compact design of the sensor system is thus advantageously possible which includes, in particular, a plurality of first and second measuring electrodes, each first measuring electrode being assigned a first counter-electrode and each second measuring electrode being assigned a second counter-electrode. The first (or second) measuring electrode and the first (or second) counter-electrode face each other and are directly adjacent to each other.

According to a preferred specific embodiment, it is provided that the length of the first measuring electrode along the deflection direction is not equal to the length of the second measuring electrode along the deflection direction, or it is provided that the length of the first measuring electrode along the deflection direction is largely equal to the length of the second measuring electrode along the deflection direction, the second measuring electrode being situated in such a way that it is offset in relation to the first measuring electrode along the deflection direction. A different first overlap and second overlap are thus easily achieved. The overlap difference between the first and second overlaps thus corresponds to either the difference in length between the first and second electrodes or the offset between the first and second electrodes. The resolution of the overlap difference depends only on the lithographic resolution of the manufacturing process.

According to a preferred specific embodiment, it is provided that the detection arrangement includes a further first measuring electrode which is designed to be largely structurally equivalent to the first measuring electrode, is electrically conductively connected to the first measuring electrode and is situated perpendicularly to the deflection direction relative to the first counter electrode in a manner which is largely mirror-symmetrical to the first measuring electrode, and/or it is provided that the detection arrangement includes a further second measuring electrode which is designed to be largely structurally equivalent to the second measuring electrode, is electrically conductively connected to the second measuring electrode and is situated perpendicularly to the deflection direction relative to the second counter-electrode in a manner which is largely mirror-symmetrical to the second measuring electrode. The resolution during detection of the deflection is thus advantageously increased and the influence of interference factors produced, for example, by an interference deflection perpendicular to the deflection direction which is superimposed upon the deflection is reduced.

According to a preferred specific embodiment, it is provided that the sensor system has a third measuring electrode which is structurally equivalent to the first measuring electrode and a fourth measuring electrode which is structurally equivalent to the second measuring electrode, the third and fourth measuring electrodes being situated on the side diametrically opposed to the seismic mass along the deflection direction, so that the seismic mass is largely situated between the first and third measuring electrodes, or between the second and fourth measuring electrodes, along the deflection direction. In this manner, a fully differential evaluation of the deflection of the seismic mass relative to the substrate along the deflection direction is made possible, which increases the accuracy and immunity to errors of the sensor system as a whole.

According to a preferred specific embodiment, it is provided that the first and/or second measuring electrode(s) is/are electrically conductively connected to an evaluation unit, in particular a capacitance-voltage converter, and/or the sensor system includes a micromechanical acceleration sensor and/or a micromechanical yaw rate sensor. It is furthermore possible that the detection arrangement includes a driving arrangement when the sensor system is in an operating state which deviates from the calibration method and are used as the detection arrangement only for calibrating the sensor system in the calibration method. The driving arrangement is then preferably provided to drive a deflection or a vibration of the seismic mass relative to the substrate along the deflection direction.

The present invention also relates to a method for calibrating a sensor system, a first electrical capacitance between the first measuring electrode and the seismic mass being measured in a first method step, and a second electrical capacitance between the second measuring electrode and the seismic mass being measured in a second method step, and a calibration factor for the sensor system being furthermore ascertained in a third method step as a function of the first and second electrical capacitances and also as a function of the overlap difference between the first overlap and the second overlap. A calibration of the sensor system is thus advantageously made possible without applying a reference deflection. This is achieved by the fact that the scaling or calibration factor must be determined from the comparison between the different first and second electrical capacitances after the overlap difference is known. The overlap difference is advantageously a fixed geometric value which is based, in particular, on the different geometric embodiments of the first and second measuring electrodes and whose accuracy depends only on the lithographic resolution of the manufacturing process. A calibration is thus carried out much more easily, faster, and more cost-effectively, which reduces the cost of manufacturing the sensor system.

According to a preferred specific embodiment, it is provided that a first voltage is ascertained as a function of the first electrical capacitance in the first method step with the aid of the evaluation unit, and a second voltage is ascertained as a function of the second electrical capacitance in the second method step with the aid of the evaluation unit, the calibration factor being ascertained in the third method step as a function of the overlap difference and also as a function of the voltage difference between the first and second voltages. In an advantageous manner, electrical voltages are comparatively easily and precisely further processed in circuit arrangement, making it possible to easily and precisely determine the calibration factor.

According to a preferred specific embodiment, it is provided that the overlap difference between the first overlap and the second overlap along the deflection direction is ascertained in the third method step, and/or the seismic mass is deflected relative to the substrate along the deflection direction in a fourth method step, the third method step being carried out at a time prior to and/or during the first and second method steps. The calibration, which is easier, faster and more cost-effective is thus advantageously made possible even for a sensor system which includes a comb electrode structure, the deflection being detected by a variation in the particular overlap surface which is produced on the basis of the deflection of the seismic mass relative to the substrate.

According to a preferred specific embodiment, it is provided that the sensor system and, in particular, the evaluation unit are calibrated as a function of the calibration factor in a fifth method step. Advantageously, the sensor system thus does not have to be in an idle position for calibrating the sensor system, which makes the calibration method easier, more precise and more cost-effective. It is thus furthermore possible to perform a (re)calibration during operation of the sensor system.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
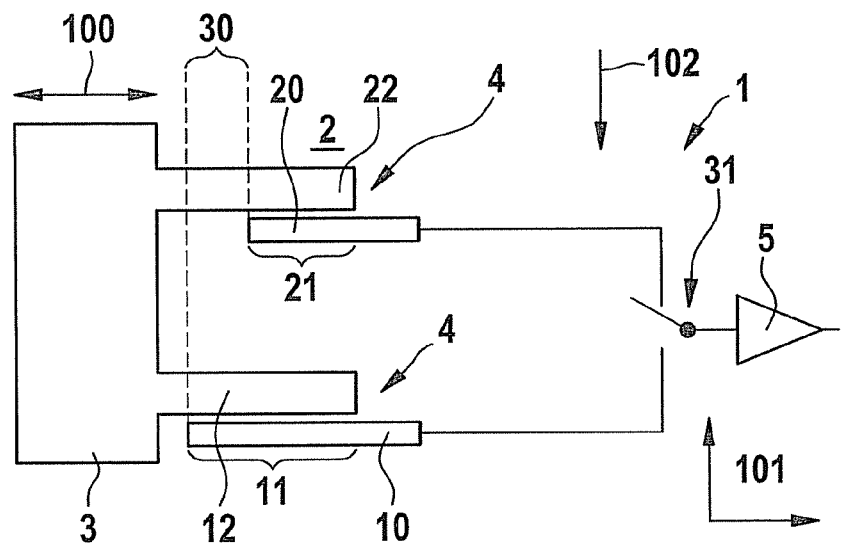
FIG. 1 shows a schematic view of a sensor system according to a first specific embodiment of the present invention.

In the different figures, the same components are provided with the same reference numerals and are therefore, generally, also named or mentioned only once in each case.

FIG. 1 shows a schematic view of a sensor system 1 according to a first specific embodiment of the present invention. Sensor system 1 includes a substrate 2 which has a main extension plane 101 largely parallel to the image plane. Sensor system 1 furthermore includes a seismic mass 3 which is movably suspended relative to substrate 2 along a deflection direction 100. Seismic mass 3 functions, for example, as a detection mass upon which inertial forces act in the presence of acceleration forces acting upon sensor system 1 from the outside, these inertial forces deflecting seismic mass 3 relative to substrate 2 along deflection direction 100. Seismic mass 3 is preferably elastically deflectable with the aid of elastic elements, which are not illustrated, on substrate 2 and at least parallel to deflection direction 100. In the present example, deflection direction 100 is oriented parallel to main extension plane 101. Alternatively, however, it would also be possible for deflection direction 100 to run perpendicularly to main extension plane 101. To determine the outer acceleration forces which are present, the deflection of seismic mass 3 relative to substrate 2 is determined with the aid of detection arrangement 4. Detection arrangement 4 include a first and a second measuring electrode 10, 20, each of which is designed to be affixed to the substrate. Seismic mass 3 furthermore includes a first and a second counter-electrode 12, 22, each of which is assigned to first and second measuring electrode 10, 20. First counter-electrode 12 is situated directly adjacent to first measuring electrode 10, while second counter-electrode 22 is situated adjacent to second measuring electrode 20. First counter-electrode 12 is overlapped by first measuring electrode 10 along a projection direction 102, which runs perpendicularly to deflection direction 100 and parallel to main extension plane 101. This overlap is referred to below as first overlap 11. Similarly, sensor system 1 has a second overlap 21, in which second counter-electrode 22 is overlapped by second measuring electrode 20 along projection direction 102. The extension of first overlap 11 along deflection direction 100 is designed to be larger than the extension of second overlap 21 along deflection direction 100, since first measuring electrode 10 along deflection direction 100 is designed to be longer than second measuring electrode 20. As a result, a first electrical capacitance may be measured between first electrode 10 and first counter-electrode 12 during a deflection of seismic mass 3 relative to substrate 2, this electrical capacitance being greater than a second electrical capacitance which is able to be measured between second measuring electrode 20 and second counter-electrode 22. Sensor system 1 furthermore includes an evaluation unit 5 in the form of a capacitance-voltage converter which converts the first electrical capacitance to a first voltage and converts the second electrical capacitance to a second voltage. Sensor system 1 must now be electrically calibrated, i.e., a scaling factor or calibration factor must be determined, which may be used to compensate for manufacturing fluctuations and inaccuracies in the evaluation circuit in the operating mode. To calibrate sensor system 1, seismic mass 3 is first deflected along deflection direction 100 and first the first voltage and then the second voltage are consecutively determined with the aid of a switch 31. Based on the different sizes of first and second overlaps 11, 21, the first and second voltages also have different levels. The scaling factor or the calibration factor is then directly determined as a function of a comparison between the first and second voltages and as a function of known geometric overlap difference 30, i.e., the difference in length between first and second measuring electrodes 10, 20 along deflection direction 100. In contrast to the related art, it is therefore not necessary to measure a known reference deflection in an idle position of sensor system 1. Overlap difference 30 between the first and second overlaps along deflection direction 100 is preferably between 1 and 2 micrometers. Sensor system 1 includes, in particular, a plurality of first measuring electrodes 10 and corresponding first counter-electrodes 12, which are designed as a meshed comb electrode structure. As an alternative or in addition, it is furthermore possible for sensor system 1 to have a plurality of second measuring electrodes 20 and corresponding second counter-electrodes 22 which are also designed as a meshed comb electrode structure.

Figure 2:
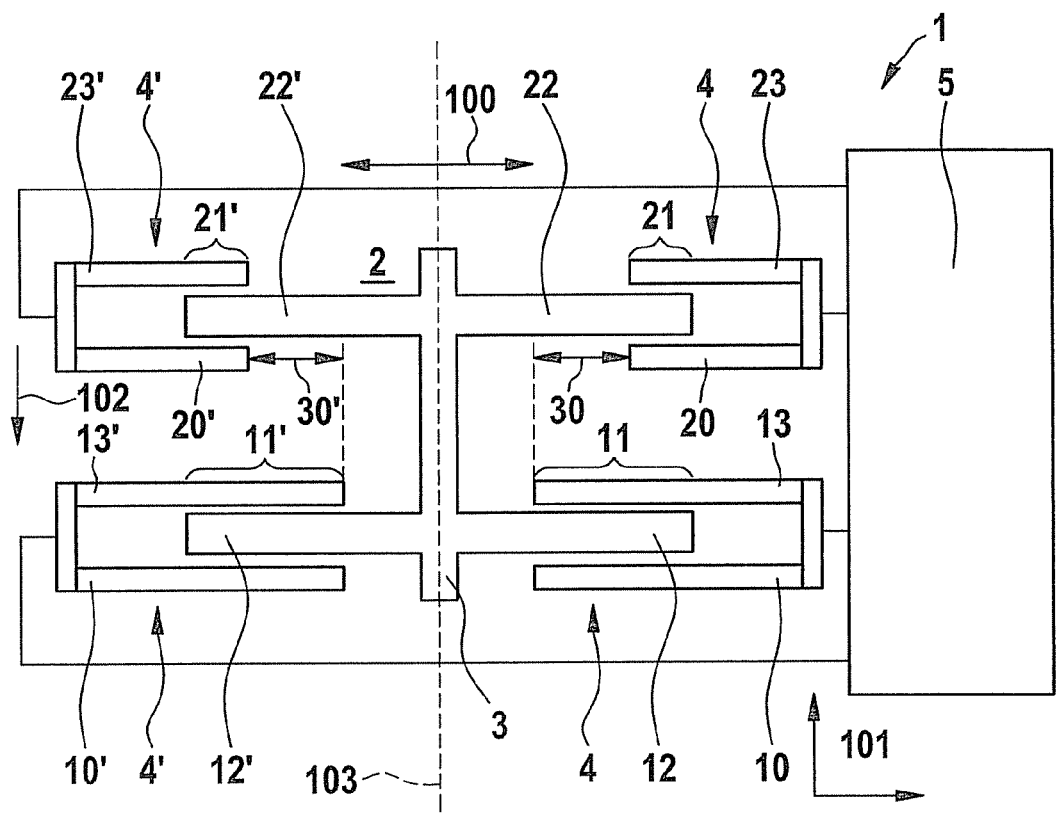
FIG. 2 shows a schematic view of a sensor system according to a second specific embodiment of the present invention.

FIG. 2 shows a schematic view of a sensor system 1 according to a second specific embodiment of the present invention, the second specific embodiment being largely equivalent to the first specific embodiment illustrated in FIG. 1, detection arrangement 4 furthermore including a further first measuring electrode 13 as well as a further second measuring electrode 23. Further first measuring electrode 13 is electrically conductively connected to first measuring electrode 10 and it is situated perpendicularly to deflection direction 100 opposite first counter-electrode 12 in a manner which is largely mirror-symmetrical to first measuring electrode 10. First counter-electrode 12 is therefore situated symmetrically between first and further measuring electrodes 10, 13 along a direction 102 which is perpendicular to deflection direction 100 and parallel to main extension plane 101. An overlap between further first measuring electrode 13 and first counter-electrode 12 is inevitably the same size as first overlap 11 between first measuring electrode 10 and first counter-electrode 12. Further second measuring electrode 23 is similarly situated and designed in relation to second measuring electrode 20 and second counter-electrode 22. In contrast to the first specific embodiment, sensor system 1 according to the second specific embodiment furthermore includes an additional detection arrangement 4' which is situated and designed in a manner which is mirror-symmetrical to detection arrangement 4 in relation to a mirror plane 103. Mirror plane 103 runs perpendicularly to main extension plane 101 and perpendicularly to deflection direction 100, and it also passes through the center of seismic mass 3. Further detection arrangement 4' includes a third measuring electrode 10' which is provided mirror-symmetrically to first measuring electrode 10, a further third measuring electrode 13' which is provided mirror-symmetrically to further first measuring electrode 13, a fourth measuring electrode 20' which is provided mirror-symmetrically to second measuring electrode 20, and a further fourth measuring electrode 23' which is provided mirror-symmetrically to further second measuring electrode 23. Seismic mass 3 furthermore includes a further first counter-electrode 12' which is mirror-symmetrical to first counter-electrode 12 as well as a further second counter-electrode 22' which is mirror-symmetrical to second counter-electrode 22. In the idle state, a further first overlap 11' between third electrode 10' (or further third electrode 13') is the same size as first overlap 11. Similarly, a further second overlap 21' between fourth electrode 20' (or further fourth electrode 23') is the same size as second overlap 22 in the idle state. Due to the mirror symmetry in relation to mirror plane 103, a further overlap difference 30' between further first overlap 11' and further second overlap 21' is always the same size as overlap difference 30. A deflection of seismic mass 3 along deflection direction 100 produces measured signals in further detection arrangement 4' which are precisely complementary to detection arrangement 4'. On the whole, the accuracy of the sensor system is thus increased by a differential evaluation of the measured signals. First, second, third and fourth measuring electrodes 10, 20, 10', 20' are each electrically conductively connected to a further evaluation unit 5 for evaluation purposes. In differentially evaluating sensor system 1 according to the second specific embodiment, the calibration method is carried out in a similar manner to the method in sensor system 1 according to the first specific embodiment, the first voltage being ascertained, for example, on the basis of the difference between the first electrical capacitance and a further first electrical capacitance between third measuring electrode 10' (or further third measuring electrode 13') and further first counter-electrode 12'. The second voltage, for example, is ascertained in a similar manner. Alternatively, however, it is also possible to first carry out the comparison between the first and second voltages, on the one hand, and the further first voltage and the further second voltage, on the other hand, and to subsequently determine the scaling factor or calibration factor from the comparison as a function of known geometric overlap difference 30. Assuming that the deflection does not change, the following applies: First voltage U1 is derived from U1 $\alpha$ $A_{ASIC} \cdot C_0 \cdot 2 \cdot x$, while second voltage U2 is derived from U2 $\alpha$ $A_{ASIC} \cdot C_0 \cdot (2 \cdot x + \lambda)$. In this case, $A_{ASIC}$ is any slowly varying amplification, $C_0 = \epsilon \cdot h_{epi} \cdot d^{-1}$ is a base capacitance, x is the deflection of seismic mass 3 parallel to deflection direction 100 and $\lambda$ is the overlap difference, i.e., in particular the difference in length between first and second measuring electrodes 10, 20. Based on the voltage difference between first and second voltage $\Delta U = U2 - U1$ and normalization to overlap difference $\lambda$, deflection x may be directly inferred with the aid of $x = U1 \cdot (2 \cdot \xi)^{-1}$, $\xi^{-1}$ being the scaling factor. $\xi$ furthermore describes the ratio between voltage difference $\Delta U$ and overlap difference $\lambda$. In this manner, scaling factor $\xi^{-1}$ may be determined and a calibration of the sensor system using the known scaling factor is possible $\xi^{-1}$. As an alternative specific embodiment, it is conceivable for seismic mass 3 to oscillate around the idle state along the deflection direction and for the measurement of the first voltage to be carried out for a complete oscillation period. The measurement of the second voltage is then carried out during a further complete oscillation period. This corresponds to an averaging and additionally simplifies the requirements for the evaluation circuit with regard to the speed of conversion from electrical capacitance to electrical voltage. It is also possible to expand this approach to include an averaging over multiple electrodes.

What is claimed is:

1. A sensor system, comprising:
   a substrate,
   a seismic mass movably suspended relative to the substrate; and
   a detection arrangement to detect a deflection of the seismic mass relative to the substrate along a deflection direction, the detection arrangement including a first measuring electrode affixed to the substrate and a second measuring electrode affixed to the substrate, wherein a first overlap between the first measuring electrode and the seismic mass is larger than a second overlap between the second measuring electrode and the seismic mass, wherein an evaluation unit is configured to calibrate the sensor system as a function of a calibration factor that corresponds to:
   a first capacitance between the first measuring electrode and the seismic mass,
   a second capacitance between the second measuring electrode and the seismic mass, and
   an overlap difference between the first overlap and the second overlap wherein the calibration factor also corresponds to a ratio between a voltage difference and the overlap difference of the first measuring electrode and the second measuring electrode relative to the seismic mass.

2. The sensor system as recited in claim 1, wherein the first overlap includes a partial covering of the seismic mass by the first measuring electrode perpendicular to the deflection direction, and the second overlap includes a partial covering of the seismic mass by the second measuring electrode perpendicular to the deflection direction, the first overlap along the deflection direction being larger than the second overlap.

3. The sensor system as recited in claim 1, wherein the seismic mass includes a first counter-electrode which is assigned to the first measuring electrode and a second counter-electrode which is assigned to the second measuring electrode in such a way that the first overlap is provided between the first measuring electrode and the first counter-electrode and the second overlap is provided between the second measuring electrode and the second counter-electrode.

4. The sensor system as recited in claim 1, wherein one of: i) a length of the first measuring electrode along the deflection direction is not equal to a length of the second measuring electrode along the deflection direction, or ii) the length of the first measuring electrode along the deflection direction is largely equal to the length of the second measuring electrode along the deflection direction, the second measuring electrode being situated in such a way that it is offset in relation to the first measuring electrode along the deflection direction.

5. The sensor system as recited in claim 3, wherein at least one of: i) the detection arrangement includes a further first measuring electrode which is largely structurally equivalent to the first measuring electrode and which is electrically conductively connected to the first measuring electrode and is situated perpendicularly to the deflection direction relative to the first counter-electrode in a manner which is largely mirror-symmetrical to the first measuring electrode, and ii) the detection arrangement includes a further second measuring electrode which is designed to be largely structurally equivalent to the second measuring electrode and which is electrically conductively connected to the second measuring electrode and is situated perpendicularly to the deflection direction relative to the second counter-electrode in a manner which is largely mirror-symmetrical to the second measuring electrode.

6. The sensor system as recited in claim 1, wherein the evaluation unit includes a capacitance-voltage converter.

7. The sensor system as recited in claim 1, wherein the sensor system is at least one of a micromechanical acceleration sensor and a micromechanical yaw sensor.

8. A method for calibrating a sensor system, the sensor system including a substrate, a mass movably suspended relative to the substrate, and a detection arrangement to detect a deflection of the seismic mass relative to the substrate along a deflection direction, the detection arrangement including a first measuring electrode affixed to the substrate and a second measuring electrode affixed to the substrate, wherein a first overlap between the first measuring electrode and the seismic mass is larger than a second overlap between the second measuring electrode and the seismic mass, the method comprising:
   measuring a first electrical capacitance between the first measuring electrode and the seismic mass in a first method step;
   measuring a second electrical capacitance between the second measuring electrode and the seismic mass in a second method step;
   ascertaining a calibration factor for the sensor system in a third method step as a function of the first and second electrical capacitances and also as a function of an overlap difference between the first overlap and the second overlap.

9. The method as recited in claim 8, wherein a first voltage is ascertained as a function of the first electrical capacitance in the first method step with the aid of an evaluation unit and a second voltage is ascertained as a function of the second electrical capacitance in the second method step using the evaluation unit, the calibration factor being ascertained in the third method step as a function of the overlap difference and also as a function of the voltage difference between the first and second voltages.

10. The method as recited in claim 8, wherein the overlap difference between the first overlap and the second overlap along the deflection direction is ascertained in the third method step, and the seismic mass is deflected relative to the substrate along the deflection direction in a fourth method step, the third method step being carried out at least one of: i) at a time prior to, and ii) during the first and second method steps.

11. The method as recited in claim 10, wherein the sensor system and the evaluation unit are calibrated as a function of the calibration factor in a fifth method step.

* * * * *